3,090,281
OPTICAL SYSTEMS
Robert Gaston André Maréchal, Paris, and Paul Laurent Croce, Issy-les-Molineaux, France, assignors to Centre National de la Recherche Scientifique, Paris, France, a corporation of France
Continuation of application Ser. No. 442,302, July 9, 1954. This application Mar. 13, 1961, Ser. No. 96,636
Claims priority, application France July 15, 1953
3 Claims. (Cl. 88—24)

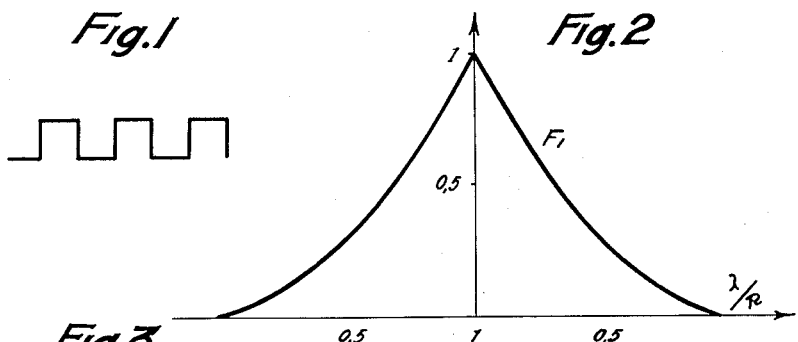
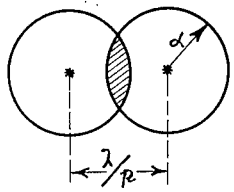
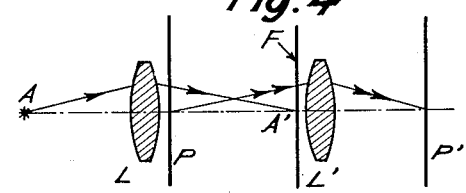
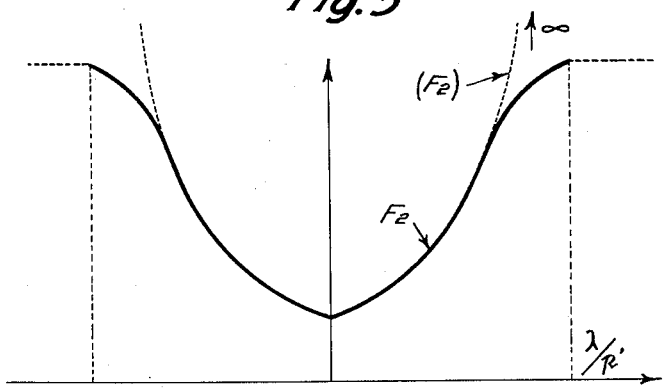
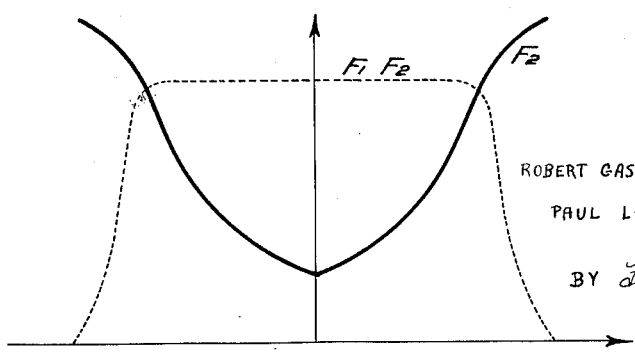
INVENTORS:
ROBERT GASTON ANDRÉ MARÉCHAL and
PAUL LAURENT CROCE
BY Frank D. Prager
ATTORNEY

The present invention relates to a system for improving the image of an object provided by an optical system or instrument and a device for working such a system. This application is a continuation of our co-pending application Serial No. 442,302, filed July 9, 1954, now abandoned.

Values of importance for the features of a preferred device will be illustrated in the drawing appended hereto, wherein:

FIGURE 1 is a graph of certain luminance values; FIGURE 2 is a graph of the transmission of values of such kind; FIGURE 3 is a geometrical representation of certain relationships of values charted in FIGURE 2; FIGURE 4 is a schematic elevation of a system for the compensation of certain features of FIGURE 2; FIGURE 5 is a graph of certain characteristics of an element of FIGURE 4; and FIGURE 6 is a graph of combined characteristics according to FIGURES 2 and 5.

The image of an object is formed by the super-position of the individual images of the various points of an object. Now, the image of a point is never reduced to a point because of the combined influences of various phenomena such as: diffraction, aberrations, diffusions and, sometimes, fluctuations (such as those produced by atmospheric turbulence in astronomic images) etc. The result of such influences is that there is not true correspondence between the image and the object.

The image is actually defined by a spatial distribution of illumination existing in a determined plane, which is the plane of the image. In connection with the problem of improving the image, for which the present invention provides a solution, an object may also be considered as a particular spatial distribution of luminance in the plane of the object; and it is possible to represent such a distribution by a function of two co-ordinates. Similarly to all usual functions, said function may be broken into a sum of sinusoidal functions, the variables of which are variables of position From the mathematical point of view, such a sum of functions is expressed in a well known way, by Fourier's transformation. In the present case, the Fourier transformation expresses the presence of characteristics of spatial distribution of luminance, which can also be called spatial frequency of luminance; and it may point out the presence of fundamental spatial frequencies (and wavelengths). These spatial frequencies therefore correspond to a periodicity for which the variable is not time but the position of the point in the plane of the object, Such periodicity is most readily seen in objects such as wire mesh, picket fences, checkerboards, etc., where the level of illumination varies in a predetermined manner as the object is scanned along a co-ordinate. Thus scanning a checkerboard along a row of marks would result in a predetermined number of changes in the level of illumination for each unit of distance along the row which defines a predetermined spatial frequency.

In this same sense, the light issued by the object may be compared to a complex signal which is composed of a plurality (sometimes an infinity) of sinusoidal elementary signals of different spatial frequencies. These elementary signals go through the optical system (or instrument) and form the image. Any optical system, and therefore any optical instrument, may thus be considered as a transmitter of signals corresponding to sinusoidal functions in which the function is the luminance of a point and the variable is the position of the point. The image provided by the instrument would be perfect if the instrument would transmit identically and correctly all said elementary signals, whichever be the spatial frequency. But such is not the case in practice. Because of the above deficiencies (aberrations, diffractions, etc.) the final result imparted by the instrument depends upon the spatial frequency of the elementary signal. A "transmission factor" may thus be considered for each elementary signal. Such a factor depends upon the considered spatial frequency and the instrument may thus be considered as a "frequency filter." The final image is the interpretation of the object, through this filter constituted by the optical system.

It is advantageous that this filter transmitting various spatial frequencies be as uniform as possible; but the imperfections which are inherent in optical systems provide a transmission factor which is maximum for a frequency equal to zero, but which decreases as frequencies rise, until the limit of resolution is reached. A frequency distortion thus appears and the optical instrument is comparable to a low-pass filter. Various authors have mathematically proved that the curve of transmission of frequency is an "auto-correlation function" of the distribution of the complex amplitudes in the pupil of the optical system.

In other words, if the obect has a spatial periodicity of luminance corresponding to spatial wavelength $p$, the optical system will transmit the periodic compound of the image only if $p$ is of a sufficiently high value. If $p$ has a low value—which corresponds to a high spatial frequency—the image will not render account of that frequency.

As an example, a periodic structure made of black and white lines of equal width may be chosen as an object. A graph of the distribution of luminance at different points on the abscissa, considered perpendicularly to the lines, is represented at FIG. 1. It is a "square wave" curve. It is understood that "photograph" means a picture or record however produced.

It is well known that such a curve may be broken down into a sum of sine curves whose frequencies are the odd multiples of a fundamental frequency. In the case of a non-periodical object, the spatial frequencies would no longer be the exact multiples of a fundamental frequency, but would make up a continuous spectrum. When the above object is used, its periodical structure is perceived with a good contrast when the spatial frequency is low, i.e. when the lines are spaced enough, but the contrast will progressively decrease and will completely disappear starting from a certain frequency, called limiting frequency or resolution.

For any optical system, a family of curves may be established which express the transmission factor as a function of the spatial frequency or wavelength. This can be done by employing an object which contains a spectrum of spatial frequencies. For example, a chart containing sinusoidal variations of shading which vary in spatial frequency in a predetermined manner can be used. Such a chart is then observed through the optical system whose transmission factor is to be determined. The observations of the chart will shown a variation in transmission of the optical system with increasing spatial frequency of the chart. A limiting spatial frequency or limit of resolution is also observed, beyond which nothing is observed. In this way, the transmission factor of a given optical system as a function of spatial frequency can be determined.

In order to clear up the matter, the particular case will be described of a stigmatic instrument with a circular pupil, whose quality is only impaired by diffraction phenomena. The curve of FIG. 2 on the appended drawing shows the transmission of spatial frequencies. It is an autocorrelation function which varies like the common surface of two identical circles, shown in FIG. 3, whose centers are separated by a distance proportional to the spatial frequency of the object: if $\alpha$ is the angular half-aperture of the cone of rays of light issued from a point in the object space and which pass through the free surface of the circular pupil of the system, and if $p$ is the spatial period of the considered sinusoidal signal, the limiting spatial distance between centers of two circles is $\lambda$ when their common radius is $\alpha$ (FIG. 3) and where $\lambda$ equals the wavelength of the light employed. The limiting period $p$ is that for which the circles are tangent, i.e. when $$p_m = \frac{\lambda}{2\alpha}$$

$\lambda$ being the wavelength of the light in the considered medium (either air or glass, etc., between object space and image space). In FIG. 2, the radius and center spacing of the two circles is plotted on the abscissa and the transmission factor on the ordinate.

When referring to the image space $\alpha'$, $\lambda'$ and $p'$ may be similarly considered and Abbe's relation shows that the same result is obtained.

In all cases, the optical system will therefore appear as a transmitter with a frequency distortion.

The present invention has for one of its objects to correct the effect of this frequency distortion. It concerns a system for correcting the images or records of images obtained in a first optical system, and which consists in means illuminating for instance the photographic record of the image by means of a source of coherent light through a second optical system, and placed in the plane of the image of the source provided by said second system, an amplitude filter of such a nature that the product of the transmissions of frequency of the filter and of the first optical system be almost constant, the final filtration of the frequencies thus being controllable. As a rule, the filter can be formed by any means providing a variation of amplitude (without any dephasing).

The experiments of Ernst Abbe (1840–1905) have shown that, when monochromatic light having a wavelength $\lambda$ is projected through a transmission grating in which the width of the slits is $h$, the light will be diffracted at an angle to either side of the axis of projection. Thus, the results of the experiment can be expressed as $$\sin \theta = \frac{\lambda}{h}$$

or approximately $$\theta = \frac{\lambda}{h}$$

With this relationship, and knowing the distance from the grating to the surface or location upon which the diffracted light is to be observed, the distance from the axis of projection to the location of the diffracted light may also be determined. In effect, the grating corresponds to an object which has a sinusoidal spatial frequency in which the period $p$ is equivalent to slit width $h$ so that $$\theta = \frac{\lambda}{p}$$

Since, with a given wavelength of monochromatic light, and a given slit width, the location of the interference fringes of the diffracted light at an angle to the axis of projection can be determined, it is possible to put a stop or equivalent opaque structure at the known location so as to block the particular wavelength of diffracted light.

In accordance with the invention, there is a recognition that an object more complex than a transmission grating can be resolved into a plurality of spatial frequencies of sinusoidal form, in accordance with the principles of Fourier analysis. The plurality of spatial frequencies extend from a zero value up to a higher value corresponding to a cut-off or limiting frequency that has been defined above as being dependent upon the wavelength of light employed and the half angle of the aperture employed in the optical system. Since the image of the more complex object includes a plurality of spatial frequencies as shown by Fourier analysis, and since any optical system has a transmission factor dependent upon spatial frequency as discussed above, it is evident that the transmitted amplitude of each of the plurality of spatial frequencies transmitted by the optical system will vary over the spectrum of frequencies. Thus, the optical system will attenuate to an increasing extent the higher spatial frequencies until the cut-off frequency is reached, at which point the attenuation will be complete.

With the transmission factor characteristic known for a given optical system, and knowing the location with respect to the axis of projection at which each spatial frequency will be diffracted in accordance with $$\theta = \frac{\lambda}{p}$$

it is proposed to place stops or devices of predetermined opacity at these locations in order to form a filter to condition the overall resulting transmission factor of the optical system and to enhance the transmission of the higher spatial frequencies. Thus, a filter can be provided based upon the known transmission factor of the optical system to attenuate the low spatial frequency portion of the spectrum so that an approximately constant transmission factor up to the cut-off frequency may be obtained.

According to the present invention, the image given by the optical instrument is recorded, for instance, on a photographic film. This image will be called primary image in the following discussion. The curve $F_1$ of transmission of spatial frequencies of the instrument (FIG. 2) is determined and, starting from the primary image, a secondary image is formed by using an optical system or restitutor operating with coherent illumination (practically monochromatic light from a point or slit source the width of which is negligible in comparison with the wavelength of said light) and having a curve $F_2$ of transmission of spatial frequencies (see FIG. 5) which is such that, for each frequency, the product $F_1 F_2$ is almost a constant (see FIG. 6). Thus for a given optical instrument having a curve $F_1$ of transmission of spatial frequencies, it is proposed to provide an optical system having a curve $F_2$ of transmission of spatial frequencies which is capable of compensating the selected optical instrument so that the resultant overall transmission factor is substantially constant. In effect, such an optical system, represented by the curve $F_2$, is conditioned for a given optical instrument having a curve $F_1$, so that the low frequency portion of the spatial frequency spectrum of the instrument is attenuated, thereby enabling a useful amplitude of the high frequency portion of the instrument to be obtained.

Such a restitutor is diagrammatically shown in FIG. 4 of the appended drawings.

A source of monochromatic or almost monochromatic light is constituted by a point A, or by a slot if a single-dimensional restitution is desired (in case of a spectrum, for example).

Rays issued from A go through a converging optical system L made of a lens, for example.

Such a system provides an image A' of A.

The photograph (primary image), provided by the initial instrument, is placed in P, in the vicinity of L. A second converging system L' of a good optical quality provides an image P' of P.

According to the present invention, in the plane A' of the image of the source A, provided by the system L, an amplitude filter F is provided. This filter is selected to provide a curve $F_2$ of transmission of spatial frequencies which is such that for each frequency the product $F_1 F_2$ be constant or almost constant, $F_1$ being the curve of transmission of frequencies of the instrument which has been used for taking the photograph.

For manufacturing such a filter F, it is necessary to know curves $F_1$ and $F_2$. In order to determine curve $F_1$ for a particular optical instrument, the following means may be used:

(a) In some cases, one may operate mathematically. If, for example, the instrument may be considered as being stigmatic, only the diffraction is to be considered and function $F_1$ is the auto-correlation function of a real function which is geometrically represented by the common surface of two contours, as already mentioned in the case of the circular pupil, in which both contours then are two circles (FIG. 3).

(b) In the presence of aberrations, the autocorrelation function may again be mathematically determined, but one may also experimentally determine the transmission factor of the instrument as a function of the spatial frequency. To this aim, one may use a target made, for example, of light and dark lines, which possess different spatial periodicity, produced by known means. A device is thus obtained with a variable spatial wavelength $p$. For each value of $p$, the contrast is determined which is obtained in the image plane, for example by means of a photoelectric cell provided with a fine slot parallel to the lines and which is displaced perpendicularly to said lines. Thus is observed, for each frequency, a minimum and a maximum value. Curve $F_1$ is established with spatial frequencies on the abscissae and with the corresponding contrast values in ordinates, the contrast being thus defined as being represented by the expression:

$$\frac{\text{maximum value} - \text{minimum value}}{\text{medium value}}$$

Curve $F_1$ being established as discussed above for a particular instrument, curve $F_2$ is easily determined, since the product $F_1F_2$ is to be made constant for any given abscissa and, for example, equal to 1. Curve $F_2$ is thus obtained, which appears in FIG. 5. Since it is impossible to obtain an infinite transparency, a limit is observed on the edges (equal to a unitary transparency), whereas the theoretical curve would be prolongated towards infinity, as indicated in dotted line in FIG. 5.

In FIG. 6, the curve has been represented in broken lines, which provides the product of the co-efficients of transmission as a function of the spatial frequencies. The gain may be seen, which is obtained with regard to the curve appearing in FIG. 2.

It is advantageous, in order to determine $F_1$, and consequently $F_2$, to consider the values with reference to the image space of the optical instrument producing the record P, since the photographic plate which constitutes the image plane of the instrument plays the part of the object plane of the second system. If $F'_1$ and $F'_2$ are the transmission factors of the image space, curve $F'_1$ is provided as a function of $1/p'$ which is the reverse of the spatial wave length of the image space of the instrument, and curve $F'_2$ is deducted from $F'_1$, since $F'_1F'_2=$constant. For manufacturing such an amplitude filter F, a certain correspondence of scale should be established between the optical instrument which has provided the original image P, and the restitutor. To this aim, a transformation of the scale of curve $F'_2$ is made in replacing the variable $1/p'$ which represents the spatial frequency by angle $\beta$ between a radius and the axis.

The transformation is made with the help of the relation $$\beta = \frac{\lambda r}{p^1}$$

$\lambda r$ being the wavelength of the light used in the restitutor.

Thus is obtained, for each value of $\beta$, the transmission factor of filter F.

The amplitude filter F may be made in various manners. A thin plate with parallel faces may be used, possessing high optical qualities. A light-absorbing substance may be deposited on said plate, by any known means, of an appropriate thickness. For example, a film of aluminum of a varying thickness may be deposited by evaporation in the vacuum, or again such a film may be deposited by galvanoplasty, photography, chemical or any other means. A more or less wide zone of interferential phenomena may be used to constitute such an amplitude filter, such as, for instance, those which occur in polarized light.

We provide variations of thickness such that the distribution of intensities (amplitudes) of light waves transmitted through the filter should correspond to the above curve $F'_2$. It is in this sense, not in the sense of color or wavelength selection, that member F acts as a filter; and the member can therefore be called an amplitude filter. For the purpose of varying the density of the film, the plate may advantageously be placed, during the evaporation of the used metal, below a removable grid provided with openings or having a suitable contour according to the desired curve $F'_2$, for example in the shape of a revolving sector of a convenient shape which is easy to establish experimentally (or to calculate) when curve $F'_2$ is known.

It should be remarked that, in the restitutor, filter F may be placed behind L'; P may also be placed in front of L, the only condition being that filter F be in the same image plane of the source and that planes P and P' be conjugated, as schematically indicated by the double arrows. It will thus be seen that according to this invention a first system or lens (L) produces a real image (A') of a small light source (A), through or across an object or primary image or photograph (P). An amplitude filter or selective light stop means (F) in the plane of the source image (A') stops or filters out certain portions of light coming from the source and object; it does so mainly by central, highly light-absorbing filter portions, represented by low, central parts of curve $F_2$. The light passing through different points of object P is diffracted to different extents, depending on the spatial frequency of object elements at each point. The more widely diffracted light reaches outer parts of filter F. Inherently the more diffracted light tends to degrade the image of the object, as shown in curve $F_1$ but, by the selective transmission of light through the filter, such degradation is compensated in accordance with a predetermined function $F_1F_2$.

In the above, the use of filters for spatial frequencies has been developed in detail in the case where such filters are used for improving the images provided by an optical system, for example in astronomy, microscopy, aerial photography, spectroscopy, cinematographic reproduction, etc., but frequency filters are of a much wider use and special effects may be obtained in choosing a convenient curve representing the product $F_1F_2$, for example, in view of reinforcing the contrast and thus improving the perception of details. The invention may particularly be used in order to attenuate the effect due to granularity of a photographic emulsion, in realizing a filter which diminishes the frequencies which correspond to such a granularity.

Summary

As an example of the use of the invention, the field of photography may be considered. When a photograph of a scene containing a spectrum of spatial frequencies is made, the lens system transmission factor and the film emulsion characteristic determine the response and range of spatial frequencies recorded in the film. As discussed, the higher spatial frequencies will be suppressed until they are completely blocked at the cut-off spatial frequency.

If such a film was to be used to produce an image such as by projection or photographic printing, the loss of detail accompanying the suppression of higher spatial frequencies would be evident. To improve the image, the filter of the invention can be employed. First a film record could be made of a chart having a spectrum of sinusoidal spatial frequencies. This record would be prepared with the same type of film emulsion and with the same camera equipment as used for the photograph previously discussed. Analysis of the film record of the chart would then indicate the transmission factor of the emulsion and camera for each spatial frequecy. In accordance with the invention, it is recognized that the photograph of the scene which is to be reproduced comprises a plurality of spatial frequencies each having a different period $p$. Furthermore, it is recognized that each spatial frequency will be diffracted when emitted from the photograph in accordance with the relation $$\theta = \frac{\lambda}{p}$$

With this relationship, it can be shown that at a plane spaced at a known distance from the photograph, the diffracted light of each spatial frequency will pass through a known position on the plane. The higher spatial frequencies having smaller periods $p$ are diffracted over a greater angle $\theta$. Thus the low spatial frequencies which are substantially transmitted are adjacent the central axis of the plane. The higher spatial frequencies which are attenuated in an increasing degree are further away from the central portion of the plane.

In accordance with the invention, the filter is fabricated knowing the transmission factor characteristic with spatial frequency of the optical elements which are to be corrected, here namely the film emulsion and camera. To achieve uniform reproduction to all spatial frequencies, it is necessary to suppress those with the highest transmission factor and enhance those of lowest transmission factor.

Since the physical portion of the filter through which a given spatial frequency passes can be determined from $$\theta = \frac{\lambda}{p}$$

the transmissibility of the filter at that portion can be selected. Knowing the transmission factor for all spatial frequencies, the transmissibility of every portion of the filter can be determined. If, for example, the transmission factor of the film emulsion and camera varied inversely and in a constant manner with spatial frequency, the filter of the invention would be fabricated with a central portion of least transmissibility and would vary in a constant manner to the periphery where would be the maximum transmissibility. The final result would be that the composite transmission factor of light passed through the filter would be substantially uniform for all spatial frequencies transmitted.

What is claimed is:

1. In an optical system, the combination including source means of substantially monochromatic light, means for positioning a photograph or the like to be reproduced, lens means for projecting said light onto said photograph, the light projected from said photograph comprising light of varying amplitude projected from a plurality of points forming spatial frequencies in the light projected therefrom corresponding to a periodicity component for which the variable is the position of the point in the plane of the photograph, said projected light being diffracted by said photograph in accordance with spatial frequencies with the angles of diffraction being proportional to said spatial frequencies, means for producing an improved image of said photograph in an image plane, said means comprising filter means having different light absorption factors over different areas thereof for varying the amplitude of said diffracted light in predetermined zones corresponding to predetermined angles of diffraction, so that the optical transmissibility of said filter means is a predetermined function of said spatial frequency, and lens means for forming a corrected image of said photograph from the light transmitted through said filter means.

2. In an optical system, the combination including source means of substantially monochromatic light, means for positioning a photograph or the like to be reproduced, lens means for projecting said light onto said photograph, the light projected from said photograph comprising light of varying amplitude projected from a plurality of points forming spatial frequencies in the light projected therefrom corresponding to a periodicity component for which the variable is the position of the point in the plane of the photograph, said projected light being diffracted by said photograph in accordance with spatial frequencies with the angles of diffraction being proportional to said spatial frequencies, means for producing an improved image of said photograph in an image plane, the optical transmissibility of said photograph and means for producing an improved image varying as a predetermined function of said spatial frequencies to a cut-off point, said means comprising filter means having different light absorption factors over different areas thereof for varying the amplitude of said diffracted light in predetermined zones corresponding to predetermined angles of diffraction, so that optical transmissibility of said filter means is a predetermined function of said spatial frequency, and lens means for forming a corrected image of said photograph from the light transmitted through said filter means.

3. An optical system in accordance with claim 1 wherein the filter means has central high light absorbing means and relatively less light absorbing areas toward the edges, the degradation of the light therethrough being compensated in accordance with the function $F_1F_2$ wherein $F_1$ is the curve of transmission of spatial frequencies of the system and $F_2$ is the curve of transmission of spatial frequencies required to compensate the system so that the overall transmission factor is substantially constant.

References Cited in the file of this patent

UNITED STATES PATENTS

| 2,384,578 | Turner | Sept. 11, 1945 |
| 2,407,211 | Yule | Sept. 3, 1946 |
| 2,420,636 | Yule | May 13, 1947 |
| 2,455,849 | Yule | Dec. 7, 1948 |